United States Patent [19]

Van Dyke

[11] 4,421,333

[45] Dec. 20, 1983

[54] ASSEMBLY FOR MOUNTING A VEHICLE SPRAY SUPPRESSION DEVICE

[75] Inventor: James R. Van Dyke, Pensacola, Fla.

[73] Assignee: Monsanto Company, St. Louis, Mo.

[21] Appl. No.: 504,076

[22] Filed: Jun. 15, 1983

Related U.S. Application Data

[63] Continuation of Ser. No. 263,520, May 14, 1981, abandoned.

[51] Int. Cl.$^3$ ............................................. B62D 25/16
[52] U.S. Cl. ............................... 280/154.5 R; 16/322; 248/291
[58] Field of Search ................. 280/154.5 R; 248/291, 248/293, 478, 122, 289.1; 16/256, 236, 322, 284, 321, 325; 49/394

[56] References Cited

U.S. PATENT DOCUMENTS

| | | | |
|---|---|---|---|
| 1,947,525 | 2/1934 | Hume | 280/154.5 R |
| 2,488,316 | 11/1949 | Mosby | 248/289.1 |
| 2,593,179 | 4/1952 | Price | 280/154.5 R |
| 2,605,119 | 7/1952 | Earnest | 280/154.5 R |
| 2,831,702 | 4/1958 | Eaves et al. | 280/154.5 R |
| 2,890,477 | 6/1959 | Miller | 16/322 |
| 2,935,336 | 5/1960 | Case | 280/154.5 R |
| 3,700,260 | 10/1972 | Moore et al. | 280/154.5 R |
| 3,746,366 | 7/1973 | Bruce et al. | 280/154.5 R |
| 3,778,086 | 12/1973 | Moore et al. | 280/154.5 R |
| 3,848,842 | 11/1974 | Jepsen | 280/154.5 R |
| 3,866,943 | 2/1975 | Innis | 280/154.5 R |
| 3,940,165 | 2/1976 | Sogoian | 280/154.5 R |
| 3,954,281 | 5/1976 | Juergens | 280/154.5 R |
| 3,999,776 | 12/1976 | Betts | 280/154.5 R |
| 4,174,653 | 11/1979 | Appleblatt | 280/154.5 R |
| 4,335,862 | 6/1982 | Sherman | 248/478 |

FOREIGN PATENT DOCUMENTS 154834 8/1954 Australia ............................... 16/284

*Primary Examiner*—Joseph F. Peters, Jr.
*Assistant Examiner*—Timothy Roesch
*Attorney, Agent, or Firm*—Thomas E. Kelley; Arthur E. Hoffman; Michael J. Murphy

[57] ABSTRACT

Structure for mounting a spray-suppression side skirt adjacent a vehicle wheel which forcibly holds the skirt against displacement in operative position perpendicular to the roadway during movement of the vehicle, yet will accommodate guided movement of the skirt to a clearance position to permit access to the vehicle wheel or to accommodate the wheel striking the skirt during turning of the wheels.

1 Claim, 4 Drawing Figures

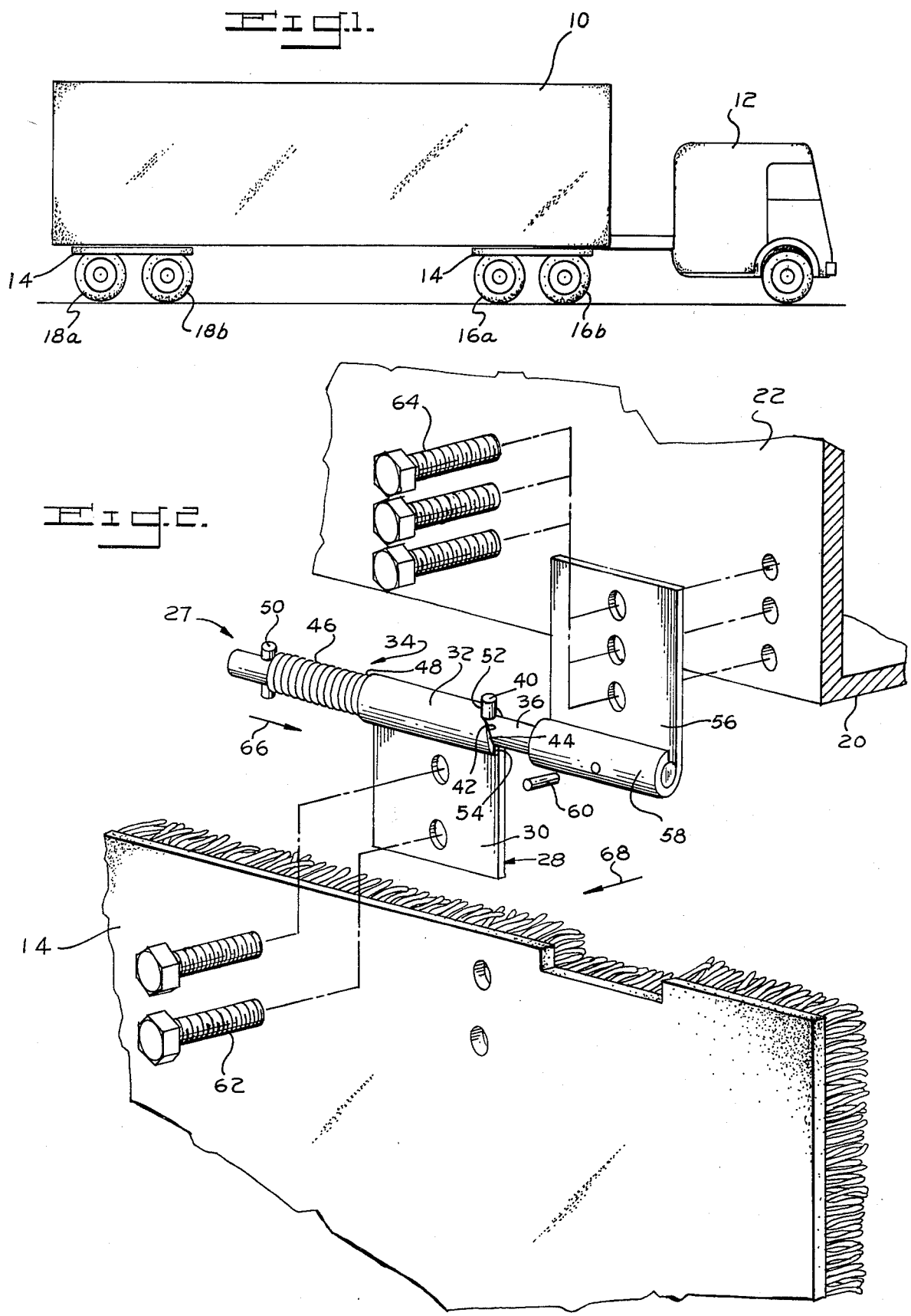

ASSEMBLY FOR MOUNTING A VEHICLE SPRAY SUPPRESSION DEVICE

This is a continuation of application Ser. No. 263,520, filed May 14, 1981 now abandoned.

BACKGROUND OF THE INVENTION

This invention relates to spray-suppression devices and more particularly to a mounting assembly for a spray-suppression side skirt which permits movement of the skirt while attached to the vehicle to a plurality of desirable positions.

Devices supported from a vehicle for suppressing spray issuing from its moving wheels while advancing along a wet roadway are, of course, well known. A typical, recent advanced version is disclosed in U.S. Pat. No. 3,899,192. It has been determined by others prior to this invention that spray-suppression efficiency can be increased by including a side skirt component in the total spray-suppression assembly in juxtaposition to the wheel at 90° to the more conventional device location behind or in front of the wheel. Such a side skirt location presents some problems in mounting that are generally non-existent in the more conventional device positions behind or in front of the wheel. For example, during high speed movement of the vehicle the side skirt cannot be allowed to deflect outwardly so as to protrude beyond the plane of the side of the vehicular assembly since this will be contrary to law. Access to the wheel being shielded for maintenance must be in the circular plane of the wheel face behind the side skirt. Such devices have been supported with springs and/or flexible plastic strips but these have been generally inadequate in solving the problems just noted.

SUMMARY OF THE INVENTION

Accordingly, it is a principal object of this invention to provide a novel side skide device mounting assembly which overcomes the aforementioned prior art difficulties.

Another object is to provide a mounting assembly for a spray-suppression side skirt which positively holds the skirt in operative position during movement of the vehicle on which it is mounted, yet permits displacement of the side skirt to a locked, out-of-the way position when access is desired to the wheel being shielded.

A specific object is to provide means permitting a side skirt device to deflect outwardly from its operative position when struck by a vehicle wheel and to return thereafter to such position after the wheel moves away.

Other objects of this invention will in part be obvious and will in part appear from the following description and claims.

These and other objects are accomplished by providing a mounting assembly for a spray-suppression device which comprises: (a) a mounting subassembly which includes: (i) mounting means for the device; (ii) shaft means supporting said mounting means; (iii) cam means associated with the shaft means yieldably holding the mounting means in an operative position but permitting movement to a clearance position in response to force applied to the device; and means for mounting such subassembly to a vehicle.

In a preferred embodiment, a spray-suppressive side skirt assembly is provided comprising a side skirt facing an adjacent vehicle wheel mounted on a vehicle in operative position generally perpendicular to a roadway supporting the vehicle, means holding the side skirt fixed in such operative position during high speed movement of the vehicle on the roadway and means permitting outward dislodgement of the side skirt away from such fixed operative position on application of a lateral force to the side skirt.

BRIEF DESCRIPTION OF THE DRAWINGS

In describing the overall invention, reference will be made to the accompanying drawings wherein:

FIG. 1 is a schematic assembly illustrating a trailer truck having spray-suppression side skirts thereon;

FIG. 2 is an exploded view with parts separated depicting a mounting assembly according to the invention for supporting the side skirt;

DETAILED DESCRIPTION OF THE ILLUSTRATED EMBODIMENT

Figure 4:
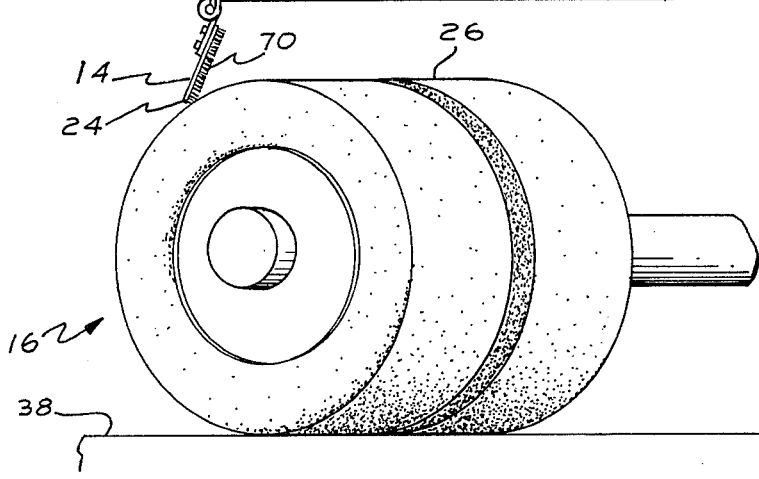
FIG. 4 is a schematic view illustrating a clearance position of the side skirt supported with the assembly of FIGS. 2 and 3.

Referring now to the drawings, FIG. 1 illustrates a vehicular assembly comprising a trailer 10 drawn by a tractor 12 having spray-suppression side skirts 14 mounted in juxtaposition to front wheel pairs 16a and 16b and rear wheel pairs 18a and 18b. In such mounted position, side skirts 14 are substantially perpendicular to the more conventional position (not shown) of spray-suppression devices in front of or behind such wheel pairs, i.e. generally perpendicular to the plane of FIG. 1. Side skirt 14 can vary widely in construction detail as long as effective in suppressing spray emanating from the wheel being shielded. It can, for example, be a smooth-surfaced, rigid plastic, rubber or like member or a substantially rigid rubber-like flap having short, rod-like projections extending from its surface toward the adjacent tire and commercially available from National Rubber Company of Toronto, Canada as "Rain Trapper". A preferred form of spray-suppression side skirt device 14 is available commercially from Monsanto Company, St. Louis, Mo. as Spray-Guard TM and which is described in U.S. Pat. No. 3,899,192, the content of which is incorporated herein by reference. The length of a side skirt 14 parallel to the long side of trailer 10 will vary with the number and size of wheels being locally shielded, as can the width of the skirt (i.e. in a direction perpendicular thereto) as determined by the extent to which it is desired to surround the vehicle wheels. Lengths of four feet (1.2 meters) and widths of six inches (0.15 meters) have been used to shield wheel pairs of the type illustrated in FIG. 1. Depending skirt 14 (FIG. 4) is mounted either from bottom surface 20 or side face 22 of trailer 10 in a manner to be further described. In a preferred arrangement, lower face 24 of skirt 14 when installed adjacent wheels 16 is about one to two inches (2.5 to 5 cms.) above a plane containing the top surfaces 26 (FIG. 4) of wheels 16, although alternatively such face 24 may be below such plane 26, as shown.

Figure 3:
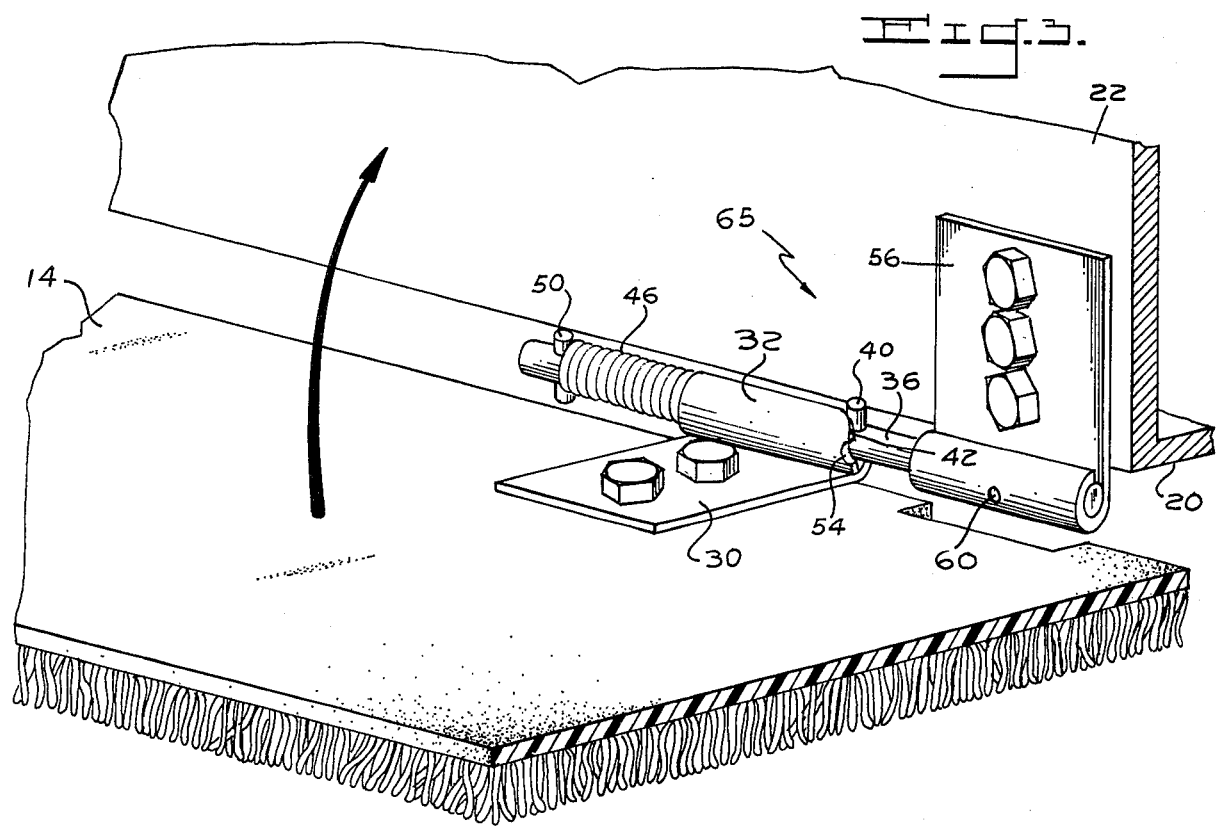
FIG. 3 is a partial, perspective view of the components of FIG. 2 in assembled condition.

Referring now to FIGS. 2 and 3, mounting assembly 27 according to the invention is shown for spray-suppression side skirt 14. Assembly 27 includes a side skirt mounting subassembly comprising mounting means 28 for side skirt 14 in the form of mounting bracket 30 having integral sleeve 32. Shaft means 34 in the form of elongated shaft 36 has sleeve 32 slidably rotatable in either direction thereon in close conforming contact with its cylindrical surface. Cam means associated with shaft means 34, and more particularly with shaft 36, yieldably holds mounting means 28, or more specifically bracket 30, in operative position generally perpendicular to roadway 38 (FIG. 4), yet permits controlled movement of side skirt 14 secured to bracket 30 to a clearance position in response to force applied to skirt 14, in a manner to be described. Such cam means, in the illustrated embodiment, comprises means projecting from shaft 36, in the form of cam pin 40 engaged in a hole in shaft 36, profile cam surface 42 formed in edge wall 44 of sleeve 32 of the skirt mounting means, such surface being yieldably biased into continuous interacting contact with projecting pin 40 via compression spring 46 which is compressively wedged between wall 48 of sleeve 32 and end pin 50 press fitted into a hole adjacent an end of shaft 36. Cam surface 42 terminates at either end (FIGS. 2 and 3) in detents 52, 54 in edge wall 44 into which pin 40 moves when sleeve 32 rotates in a manner to be described. Detent 54 is at 180° to 52 in FIG. 2.

Mounting assembly 27 further comprises means for mounting the subassembly just described to trailer 22 which in the illustrated embodiment comprises bracket 56 having sleeve 58 integral therewith through which locking pin 60 passes into engagement in a through hole in shaft 36 to detachably secure such bracket to the shaft. By removing locking pin 60 and turning bracket 56 downwardly 90° from the FIG. 2 position, drilling another hole in sleeve 58 and again inserting such locking pin through shaft 36, the subassembly can be mounted on the lower face 20 of trailer 10 instead of sidewall 22 thereof. Conventional fasteners such as bolts 62, 64 and associated threaded nuts can be used to secure skirt 14 to bracket 30 and subassembly 26 to trailer 10 respectively.

In the assembled form of FIG. 3, a spray-suppression side skirt assembly 65 is provided comprising side skirt 14 which, when pivoted 90° downwardly in a manner to be described, faces adjacent vehicle wheel 16 and is then mounted in normal predetermined, operative position on a vehicle, such as trailer 10, generally perpendicular to roadway surface 38 supporting trailer 10. Means holding the side skirt fixed against sidewise movement in such operative position during over-the-road movement of the vehicle on the roadway and preventing skirt 14 from flipping outwardly away from side 22 of trailer 10 under the influence of air currents and/or wind forces comprises, in the illustrated embodiment, cam pin 40 in wedged engagement in detent 52 of end wall 44 of sleeve 32 of skirt mounting bracket 30, the latter being forcibly urged axially on shaft 36 in the direction of arrow 66 (FIG. 2) via compression spring 46.

Assembly 65 further includes means permitting outward dislodgement of side skirt 14 in the direction of arrow 68 away from such just described fixed operative position, on application of sufficient lateral force to side skirt 14. In the illustrated embodiment, such means comprises the yieldable positioning of bracket 30 via compression spring 46 and the contour of profile surface 42 of edge wall 44 of sleeve 32. Thus, forcing skirt 14 in arrowed direction 68 with sufficient magnitude causes bracket 30 carrying skirt 14 to rotate outwardly against the axial compression of spring 46 while profile surface 42 remains in surface engagement with pin 40. Such outward dislodgement of skirt 14 can occur as a result of the tire on wheel 16 striking skirt 14 as shown schematically in outline form in FIG. 4, when, for example, tractor 12 is maneuvering trailer 10 about or the wheel rides up over a curb. When such force is dissipated the compressive action of spring 46 in combination with the contour of profile surface 42 will automatically cause bracket 30 holding skirt 14 to rotate clockwise (when viewed along arrow 66) away from the canted position of FIG. 4 toward and back down into operative position until pin 40 again wedges tightly within detent 52. Since profile surface 42 has a component formed around the circumference of end wall 44 of sleeve 32 rearward of that shown in FIG. 2, force applied opposite to that of arrow 68 will cause the same type of rotative movement in the opposite direction and the same return action of the bracket and skirt to the operative position. Such additional portion of the profile surface in combination with pin 40 and compression spring 46 forms means permitting inward dislodgement of the side skirt away from the fixed operative position on application of an inwardly directed lateral force to skirt 14 opposite to that depicted by arrow 68.

Access to the wheel being shielded by a side skirt 14 may be desired, such as, for example, for a maintenance purpose such as to replace a tire or other component of the wheel, or to apply non-skid chains around the wheel circumference. In such case, skirt 14 via the cooperative action of compression spring 46, profile surface 42 and pin 40 may be pivoted 180° upward from the FIG. 2 position so that it is coextensive with and lies immediately adjacent trailer sidewall 22 with the spray-suppression surface 70 facing outwardly and locked in this out-of-the-way position via the wedged cooperation of pin 40 in lower detect 54 in edge wall 44. With this provision it is possible to operate the vehicular assembly with the side skirt releasably locked in such out-of-the-way position without being concerned about dislodgement when, for instance, it might be desirable to operate with tire chains which could undesirably engage side skirt surface 70 if it were in the normal operating position. When it is desired to return skirt 14 to its operative wheel-shielding position, this is done by manually pulling skirt 14 outwardly until pin 40 dislodges from detent 54 against the force of spring 46 and urging it downwardly until pin 40 again reestablishes engagement with the walls of upper detent 52 to hold skirt 14 in its operative wheel-shielding position.

The preceding description is set forth for purposes of illustration only and is not to be taken in a limited sense. Various modifications and alterations will be readily suggested to persons skilled in the art. It is intended, therefore, that the foregoing be considered as exemplary only and that the scope of the invention be ascertained from the following claims.

What is claimed is:

1. A spray-suppression apparatus for a tractor-trailer adapted to be mounted on a forward portion of a trailer adjacent the upper outside surface of at least one rear tire of tractor comprising:
   a side skirt having a height greater than the distance between the bottom edge of the trailer and the top of said tire; and
   at least one hinge assembly for mounting said side skirt to said trailer in a position generally parallel to the side of said trailer whereby said side skirt occludes vertical space between said trailer and the top of said tire; said hinge assembly having a horizontal pivotal axis substantially parallel to a side of the trailer said hinge assembly having a spring-loaded cam urging the skirt toward a generally vertical orientation while allowing the skirt to pivot about said axis, wherein the lower edge of the skirt can pivot outwardly and upwardly toward a raised position when contacted by said tire of the trailer, said hinge assembly also having a detent for holding said skirt in a raised position.

* * * * *